April 29, 1952      H. D. GULNAC      2,594,916
AUTOMATIC GAIN CONTROL CIRCUITS
Filed Nov. 26, 1947      2 SHEETS—SHEET 2
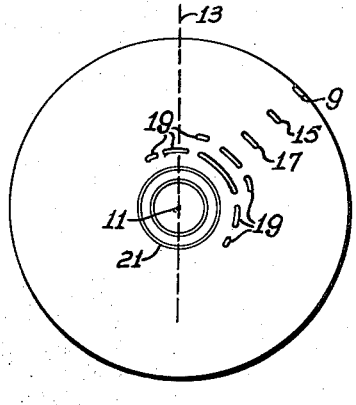
FIG_4
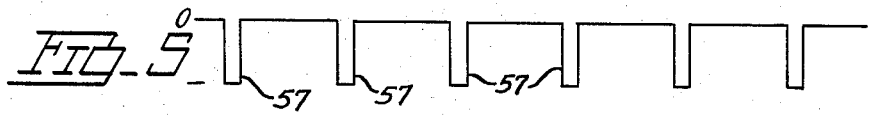
FIG_5
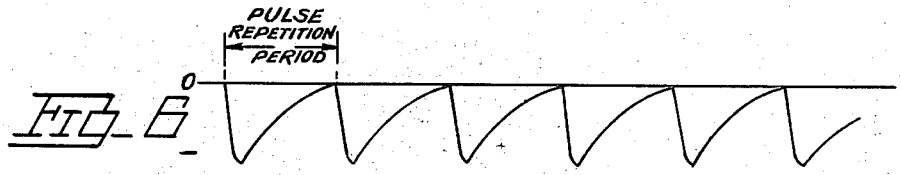
FIG_6
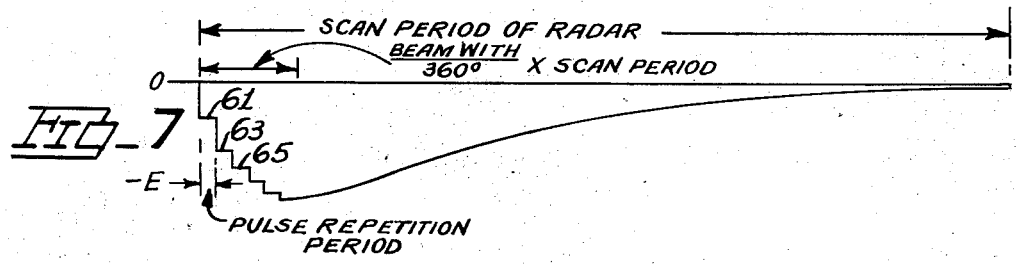
FIG_7
*Inventor:*
Howard D. Gulnac
By J. L. Whittaker
*Attorney*

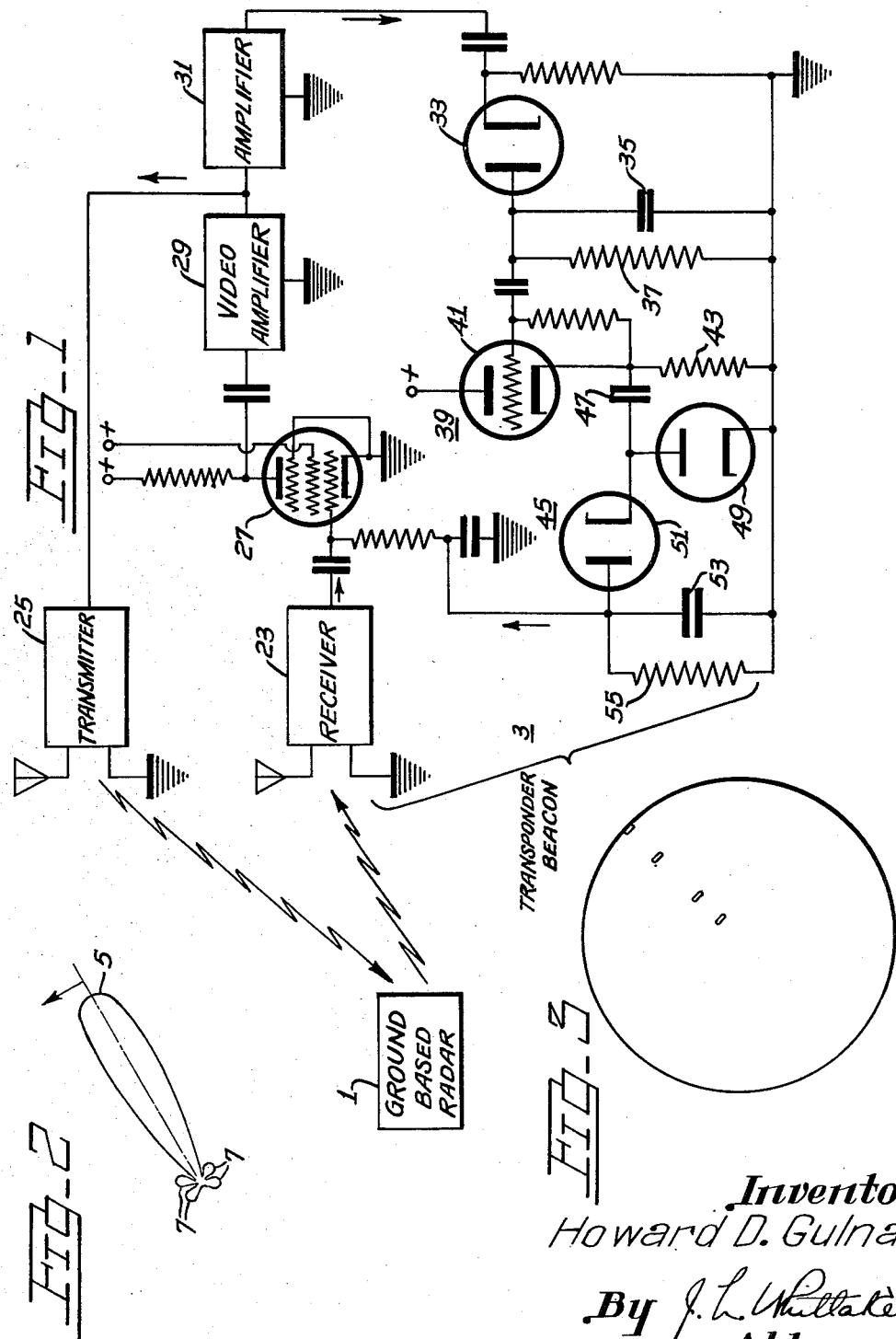

Patented Apr. 29, 1952

2,594,916

UNITED STATES PATENT OFFICE 2,594,916

AUTOMATIC GAIN CONTROL CIRCUITS

Howard D. Gulnac, Collingswood, N. J., assignor to Radio Corporation of America, a corporation of Delaware Application November 26, 1947, Serial No. 788,198

5 Claims. (Cl. 343—11)

This invention relates to improvements in control circuits such as automatic gain control circuits, and more particularly, but not exclusively, to gain control circuits for pulse radio receivers as used in radar transponder beacons. The term "transponder" as used herein is intended to mean a beacon including a receiver designed to receive signals which are referred to hereinafter as "interrogation" signals, and a transmitter controlled by the output of said receiver to transmit other signals which are called "reply" signals.

One use for transponder beacons is in aircraft which are to be located and identified by search radar apparatus. A beacon will provide a reply signal which is much stronger than the reflected radar signal; the reply signal may be on a different frequency from the radar signal, enabling the separation at the radar station of "ground clutter" or fixed echoes from the desired reply signals. Usually the reply signal is coded in some manner to identify the aircraft. As will be described, it is necessary, in such use of a transponder beacon, to control the sensitivity or gain of the beacon receiver in accordance with the strength of the received radar signal.

Accordingly, it is a specific object of the present invention to provide automatic gain control circuits for radar transponder beacon receivers.

Another object is to provide improved means for rapidly charging a network which has a relatively large time constant to an extent which depends on the amplitude of a signal of relatively short duration.

The invention will be described with reference to the accompanying drawing, wherein:

Figure 1 is a schematic diagram of a radar and transponder system, in which the transponder embodies the present invention, Figure 2 is a polar graph of a typical directive pattern of a search radar antenna, Figure 3 shows the display which should be produced by a search radar in response to aircraft at the same bearing but at various distances, Figure 4 shows the type of display which may be produced by a search radar set in response to aircraft carrying transponder beacons, Figure 5 is an oscillogram showing the output of the transponder beacon receiver of the system of Figure 1, Figure 6 is an oscillogram showing a voltage produced in the operation of the gain control circuit of the beacon of Figure 1, and Figure 7 is an oscillogram which illustrates the control voltage produced by said gain control circuit.

Referring to Figure 1, a ground based search radar 1 transmits a pulse modulated radio signal in a directive beam which is rotated slowly in azimuth to scan the surrounding territory. Aircraft, and all other reflecting objects in the territory, reflect some of the transmitted energy back to the radar. The reflections can be detected and indicated by the radar; however, it is desirable to distinguish between aircraft and other objects.

This is accomplished by providing, on each craft with which the system is to be used, a transponder beacon 3 which is controlled or "triggered" by signals received from the radar station to send out reply signals on a frequency different from that of the radar system. The reply signals are received at the radar station 1 and used to produce a display which shows only the aircraft equipped with transponders.

A radar signal of at least certain minimum strength is required at the beacon receiver in order to operate the beacon transmitter. As a corollary, the beacon ordinarily will be triggered by any radar signal which is stronger than said minimum. This would not be particularly objectionable if the radar antenna could transmit only in one direction at a time; however, as shown in Figure 2, the directive pattern of a typical radar antenna includes not only a relatively sharp main lobe 5, but also a number of secondary lobes 7, which extend throughout a wide angle in azimuth.

When the transponder is at a considerable distance from the radar station, for example 100 miles, the signal strength is sufficient to trigger it only when the main lobe 5 is pointed toward the aircraft. Assuming that the radar 1 is of the PPI (plan position indicator) type, the resulting indication will be a small spot or "pip" 9 (see Figure 4) at a radial distance from the center 11 of the display corresponding to the distance of the aircraft from the radar station, and at an angle, with respect to some reference direction 13, corresponding to the bearing of the craft.

An aircraft which is somewhat closer to the ground station, for example at a distance of 75 miles, will receive a signal of the requisite strength during a greater portion of the sweep of the radar beam, producing a wider pip 15 on the radar display. The bearing of the aircraft can be found simply by determining the center of the extended pip. As the craft approaches the ground station, the azimuthal width of the pip will remain about the same, as shown by the pip 17 in Figure 4, until the signal strength in the side lobes 7 is enough to operate the transmitter.

When this happens, additional pips 19 appear in the radar display, corresponding to the larger side lobes in the antenna pattern. As the craft comes still closer to the radar, the smaller side lobes produce pips, and finally sufficient energy is received to trigger the beacon at all azimuths, and produce a full circle on the display, as shown at 21 in Figure 4. There is no way of determining the bearing of an aircraft from the circular trace 21.

To prevent the above-described broadening of indications in the radar display, it is necessary to vary the minimum signal lever required to operate the beacon more or less according to the maximum strength of the signal being received at the beacon. This calls for an automatic gain control circuit which will respond to the signals received during the time the main lobe of the radar beam travels past the aircraft, and will maintain control of the receiver during the entire scanning period of the radar.

A typical search radar set might scan the entire horizon in five seconds. The half-power width of the main beam lobe is of the order of one degree. The time required for the beam to sweep past a given point is 1/360 x 5 seconds, or about 14 milliseconds. In other words, the gain control system must provide control output over a period of five seconds in response to information supplied to it during a period of about 0.014 second.

Referring again to Figure 1, the transponder beacon 3 includes a receiver 23, a transmitter 25, and means including an amplifier tube 27 and a further amplifier 29 for applying the output of the receiver 23 to the transmitter 25. The tube 27 may be structurally a part of the receiver 23 and/or the amplifier 29, but is shown separately herein for the purpose of clarity.

The tube 27 is preferably of the remote cutoff pentode type, and is connected as a resistance coupled amplifier between the receiver 23, which may be merely a detector, and the amplifier 29. Grid bias for the tube 27 is supplied by the automatic gain control circuit to be described.

The output of the amplifier 29, besides being supplied to the transmitter 25, also goes to another amplifier 31, which is coupled through a diode 33 to a small capacitor 35 shunted by a resistor 37. The values of the capacitor 35 and the resistor 37 are such that their time constant, i. e. RC product, is approximately the same as the pulse repetition period of the search radar 1. This may be of the order of 0.001 second. The A. C. component of whatever voltage appears across the resistor 37 is applied to a cathode follower circuit 39, which comprises a tube 41 with its load resistor 43 connected in its cathode circuit. The output of the cathode follower, appearing across the resistor 43, is applied to an averaging cycle counter circuit 45. The counter 45 includes a capacitor 47, a diode 49 connected to ground, and a diode 51 connected to a storage capacitor 53 which is shunted by a resistor 55.

The upper end of the resistor 55 is connected to the grid return circuit of the remote cutoff tube 27. The RC product of the capacitor 53 and the resistor 55 is several times the scan repetition period of the radar 1. For example, the capacitor 53 may be about 2 microfarads, and the resistance 55 may be about 10 megohms, giving a time constant of 20 seconds.

The connections and the number of amplifier stages are such that signals received from the radar station produce negative going pulses at the cathode of the diode 33. A small portion of the pulse train, which occurs only during the time the radar beam sweeps past the beacon, is shown in Figure 5. This oscillogram is not to scale, because the pulses 57 are perhaps 1 microsecond wide and are separated by intervals of about 1000 microseconds.

The diode 33 allows each pulse to charge the capacitor 35 to substantially the full voltage of the pulse during the existence of the pulse. The resistor 37 discharges the capacitor 35 substantially completely during the interval between two successive pulses. The resultant voltage across the resistor 37 is a negative going wave of generally sawtooth shape, as shown in Figure 6. The repetition period of the wave of Figure 6 is the same as the radar pulse repetition period, and the amplitude corresponds to that of the output of the amplifier 31.

At this point it should be noted that if a conventional automatic gain control circuit were to be used in the beacon of Figure 1, the resistor 37 would be connected directly to the tube 27. The capacitor 35 and the resistor 37 would have to be made larger, to provide a time constant of the order of 10 or 20 seconds. It would then be found practically impossible to charge the capacitor to a voltage anywhere near the pulse amplitude, because only a few pulses (perhaps 10) are received during the time the radar beam sweeps past the beacon. Since each pulse is only 1 microsecond wide, the total effective charging time would be only 10 microseconds.

Returning to the operation of the present system, the sawtooth wave at the resistor 37 is reproduced by the cathode follower across the resistor 43, substantially at the same amplitude but at a much lower impedance level. During the build-up, i. e. the negative going leading edge portion, of each sawtooth wave, the capacitors 47 and 53 are charged in series through the diode 51. During the positive-going part of the sawtooth wave, the capacitor 47 discharges through the diode 49, but the diode 51 does not conduct.

As the capacitor 47 is cyclically charged through the diode 51 and discharged through the diode 49, the capacitor 53 is negatively charged step by step. This is shown in Figure 7, where the steps 61, 63 and 65 are produced by successive sawtooth waves.

It is evident that the steps decrease in size during the charging period; this is partly because the voltage on the capacitor 53 approaches the peak amplitude of the sawtooth wave, so that smaller currents flow during successive waves, and partly because the beam of the search radar is moving past the beacon and the received signal strength is decreasing. The various circuit constants are preferably chosen so as to deposit the maximum possible charge in the capacitor 53, while maintaining the required RC product.

As the radar beam leaves the beacon, the pulses from the amplifier 31 cease, and so does the charging of the capacitor 53. The voltage across the capacitor 53 at this time depends upon the signal strength of the pulses which were received from the radar station during the charging interval, and thus the amplification provided by the tube 27 is reduced below its maximum value by a corresponding amount.

During the remainder of the radar scan, about five seconds, the resistor 55 gradually discharges the capacitor 53, and the amplification of the tube 27 increases accordingly. The discharge is so slow that the gain does not increase enough during the scan period to permit the output of the amplifier 29 to actuate the transmitter 25 again until the main lobe of the radar beam returns to the beacon.

As the aircraft approaches or departs from the radar station the average magnitude of the voltage on the capacitor 55 varies accordingly, controlling the tube 27 to prevent response to the secondary lobes of the radar beam. Referring to Figure 3, the pips appearing on the radar display representing aircraft at various distances are uniformly narrow like the main lobe of the radar beam.

Although the invention has been described as embodied in a radar transponder beacon, it will be apparent to those skilled in the art that its use is not limited thereto, but extends to various other applications wherein variable information is available in brief bursts and must provide control throughout relatively long intervals.

I claim as my invention:

1. In a radio receiver which includes an amplifier variable in gain according to an applied control voltage and which is intended to receive signals which comprise short trains of pulses, said trains being separated by relatively long intervals, an automatic gain control circuit including: a first load circuit, a rectifier, and means applying said received signals to said first load circuit over said rectifier, the load circuit including a first storage capacitor and a first discharge resistor whose resepective capacitance and resistance and whose arrangement with respect to the rectifier are such that said capacitor is substantially fully charged through the diode by each of said signal pulses and is substantially fully discharged by said resistor in the interval between each two of said pulses to produce for each train of pulses a train of saw-tooth voltages; a cathode follower amplifier circuit, and means applying the saw-tooth voltages to the input of said cathode follower circuit; an averaging cycle counter connected to the output of said cathode follower for responding to saw-tooth voltages received therefrom to provide a control voltage increasing stepwise during reception of successive pulses of one of said trains, said averaging counter including a second load circuit comprising a second storage capacitor and a second discharge resistor, said last mentioned load circuit having a time constant which is long compared to said intervals between said trains of pulses, and means for applying the control voltage to said first-mentioned amplifier to vary its gain according to the amplitude of the pulses of said received signals.

2. In a radio receiver which includes an amplifier variable in gain according to an applied control voltage and which is intended to receive signals which comprise short trains of pulses, said trains being separated by relatively long intervals, an automatic gain control circuit including means integrating said pulses individually to produce a substantially sawtooth wave train in response to each of said pulse trains; a load circuit comprising a storage capacitor and a discharge resistor, said load circuit having a time constant which is long compared to said intervals between said pulse trains, means charging said storage capacitor in response to each of said sawtooth wave trains to produce a control voltage, said last mentioned means including a cycle counter and a cathode follower amplifier responsive to said sawtooth wave to drive said counter and means for applying the control voltage to said first-mentioned amplifier to vary its gain according to the amplitude of the pulses of said received signals.

3. In a radar system including a ground based search radar set providing a pulse modulated radio beam which rotates to scan the surrounding area, and at least one mobile station including a receiver responsive to signals from said ground station and a transmitter responsive to output from said receiver to transmit reply signals to said search radar, means preventing transmission of reply signals from said mobile station in response to side lobes of said radio beam, including means responsive to pulses received at said mobile station to provide a voltage wave whose amplitude is proportional to the amplitude of said received pulses, a cycle counter responsive to said voltage wave to provide a control voltage increasing step-wise during reception of said pulses and including a load circuit having a time constant in excess of the scanning period of said radar set, and means controlling the gain of said receiver in response to said control voltage.

4. In a radio receiver which includes an element responsive to an applied control voltage to vary the gain of the receiver and which is intended to receive signals which comprise short trains of pulses, said trains being separated by relatively long intervals, an automatic gain control circuit including: an integrating circuit comprising a first load circuit, a rectifier, and means applying said received signal to said first load circuit over said rectifier, said first load circuit including a first storage capacitor and a first discharge resistor, the time constant of said first load circuit being relatively short compared to the interval between each two of said pulses; an averaging cycle counter for receiving a train of integrated pulses and translating it into a control voltage and including a second load circuit comprising a second storage capacitor and a second discharge resistor, said last mentioned load circuit having a time constant which is long compared to said intervals between said trains of pulses, means applying integrated pulses from said first storage capacitor to said cycle counter and means for applying the control voltage to said element of the receiver to vary its gain according to the amplitude of the pulses of said received signals.

5. In a radio receiver which includes an element responsive to an applied control voltage to vary the gain of the receiver and which is intended to receive signals which comprise short trains of pulses, said trains being separated by relatively long intervals, an automatic gain control circuit including means integrating said pulses individually to produce a substantially sawtooth wave train in response to each of said pulse trains; a load circuit comprising a storage capacitor and a discharge resistor, said load circuit having a time constant which is long compared to said intervals between said pulse trains, means charging said storage capacitor stepwise in response to each of said sawtooth wave trains to produce a control voltage, said last mentioned means including a cycle counter and means applying said sawtooth wave to said counter and means for applying the control voltage to said element of the receiver to vary its gain according to the amplitude of the pulses of said received signals.

HOWARD D. GULNAC.

REFERENCES CITED

The following references are of record in the file of this patent:

UNITED STATES PATENTS

| Number | Name | Date |
|---|---|---|
| 2,167,492 | Sproule | July 25, 1939 |
| 2,223,995 | Kotowski | Dec. 3, 1940 |
| 2,414,992 | Wheeler | Jan. 28, 1947 |
| 2,417,717 | Tellier | Mar. 18, 1947 |
| 2,422,069 | Bedford | June 10, 1947 |
| 2,435,960 | Fyler | Feb. 17, 1948 |
| 2,450,360 | Schoenfeld | Sept. 28, 1948 |
| 2,522,110 | Forster | Sept. 12, 1950 |